Patented Sept. 29, 1942

2,297,147

UNITED STATES PATENT OFFICE 2,297,147

SYNTHESIS OF CARBON-HALOGENATED ALKYL AMINES

Henry B. Hass, West Lafayette, Ind., and Hal C. Huffman, Long Beach, Calif., assignors to Purdue Research Foundation, West Lafayette, Ind., a corporation of Indiana No Drawing. Application August 14, 1940, Serial No. 352,518

14 Claims. (Cl. 260—583)

The object of this invention is to effect the synthesis of compounds of the general formula:

(1) 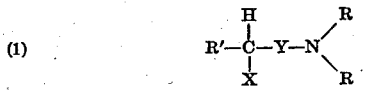

in which R and R' each represents a member of the class consisting of hydrogen atoms and alkyl groups, which alkyl groups may be the same or different, with R' preferably representing an alkyl group, Y represents an acyclic divalent saturated lower-hydrocarbon radical, and X represents a middle halogen, by which we mean a member of the class consisting of bromine and chlorine.

These compounds are of value as intermediates in the synthesis of various drugs, of the general class of which atebrin and plasmoquin (plasmochin) are representative. These intermediates have formerly been prepared only with difficulty, when prepared at all; for in previous procedures the tendency to ring closure has been so great that in some cases the desired compound could not be isolated. For instance, Clemo and Hook, (J. Chem. Soc., 1936, page 608,) were unable to obtain the crystalline hydrochloride of 4-chloroamyldiethylamine, although it is easily prepared by our process.

We have found that it is possible to take advantage of the fact that an iodine atom is more reactive than is a similarly situated chlorine or bromine atom in a compound of the general formula:

(2) 

to aminate selectively a chloro-iodo or bromo-iodo derivative of a saturated hydrocarbon with ammonia, a primary amine, or a secondary amine, to replace the iodine atom by the amine group while obtaining relatively little replacement of the chlorine or bromine atoms. By amination, we mean broadly the reaction by which a halide is converted into an amine, regardless of whether ammonia or an amine is employed as the aminating agent.

The initial chloro-iodo or bromo-iodo derivative of a saturated hydrocarbon, of Formula 2 above, may be made in any convenient way. One convenient way, except when the two middle halogens are on adjacent carbon atoms, is by producing a reaction in acetone of a dibromide, dichloride, or chlorobromide of the desired saturated hydrocarbon with sodium iodide. For example, 1-iodo-4-chloropentane (in which R' is an alkyl group, specifically the methyl group) may be prepared in the following manner:

One and one-fourth moles (177 g.) of 1,4-dichloropentane is added to 1500 ml. of a dry acetone solution containing 1.35 moles (202.5 g.) of sodium iodide. The mixture is heated to reflux for twenty-five hours. Sodium chloride precipitates during reaction, and the solution becomes orange-red in color. The mixture is cooled and filtered. The sodium chloride is preferably washed thoroughly with acetone, and the acetone washings added to the filtrate. The filtrate is transferred to a distilling flask, and most of the acetone is removed by distillation at ordinary pressure. The residue is shaken with several times (say six times) its volume of water to which has been added a few grams of sodium thiosulfate (just enough to react with any free iodine present), and the water dissolves the acetone and the inorganic compounds present, and leaves as a separate layer the liquid 1-iodo-4-chloropentane, which as thus prepared is light yellow in color. This oily layer of the organic iodide is separated, diluted with a little ether, and the mixture dried over anhydrous calcium chloride. By rectifying this mixture, there is obtained about 14.7 g. of unreacted 1,4-dichloropentane, 240.1 g. of 1-iodo-4-chloropentane, and 20.9 g. of 1,4-di-iodopentane. Thus the yield of 1-iodo-4-chloropentane is about 90%, based on the initial dichloride.

The same general procedure may be used to prepare other chloro-iodides or bromo-iodides of saturated hydrocarbons, such for instance as 1-iodo-3-chloropropane, 1-iodo-3-chlorobutane, 1-iodo-4-chlorobutane, 1-iodo-3-chloropentane, 1-iodo-5-chloropentane, and 2-iodo-4-chloropentane.

A representative example of our amination is the preparation of 4-chloroamyldiethylamine, which may be as follows: To 48.3 g. (0.66 moles) of diethylamine 39.5 g. (0.17 moles) of 1-iodo-4-chloropentane is added dropwise over a period of five hours, with continuous agitation. The addition is carried out at room temperature. Heat is evolved, and a mushy solid formed, probably consisting of 4-chloroamyldiethylamine hydroiodide and diethylamine hydroiodide. This mixture is stirred for about an hour after all the 1-iodo-4-chloropentane has been added. Then the mixture is treated with approximately 100 ml. of water, and the whole is transferred to a separatory funnel. Then about 125–150 ml. of a ten-percent solution of sodium hydroxide is added, the mixture is well shaken, and then allowed to stand. Two layers form. The lower layer, which is a solution containing sodium hydroxide and sodium iodide, is drawn off from the separatory funnel. The upper layer is retained in the separatory funnel, and consists of diethylamine, 4-chloroamyldiethylamine, and unreacted 1-iodo-4-chloropentane. It is washed several times (say three times) with 25–35 ml. portions of water; which removes most of the diethylamine. Then the remainder is taken up in about 100–125 ml. of ether. The resultant ether solution is washed with 50 ml. of water, and dried over anhydrous calcium sulfate.

This dried ether solution is filtered, and then cooled to about 0° C. Then dried hydrogen chloride is passed into it, which causes immediate precipitation of the hydrochloride of 4-chloroamyldiethylamine as a very fluffy white solid. Best results may be obtained if the crystals so formed are filtered off in several batches—that is, if hydrogen chloride is passed in for a few minutes, and the crystals formed are then separated (as by filtering), washed with dry ether, and immediately placed in a vacuum desiccator, and then more hydrogen chloride is added to the filtrate to obtain more crystals, which are separated and washed and placed in a vacuum desiccator, and this process is repeated until no more precipitation takes place. The crystals are very hygroscopic, and best results are obtained if in the filtering the crystals are protected from the moisture of the air.

The crude product thus obtained melts at about 90° to 99° C. A yield of about 42%, based on the amount of iodochloride put into the reaction, may ordinarily be realized. The crude product may be recrystallized by taking it up in a mixture of equal volumes of dry 1-butanol and dry acetone, and adding dry ether until the solution becomes milky; upon cooling, crystals form readily. Ordinarily, two recrystallizations are sufficient to produce a constant-melting product, which begins to soften at 95° C., and melts with decomposition at 99.0° C. ± 0.1° C.

Among other chloroalkyldialkylamines which may be prepared in this general manner are, for example, 3-chloropropyldiethylamine, 3-chlorobutyldiethylamine, 4-chlorobutyldiethylamine, 3-chloroamyldiethylamine, 5 - chloroamyldiethylamine, and N(1-methyl-3-chlorobutyl)diethylamine.

The analogous dimethylamines, dipropylamines, methylethylamines, methylpropylamines, ethylpropylamines, monomethylamines, monoethylamines, monopropylamines, monobutylamines, and unsubstituted amines, to mention only a few examples, may be similarly prepared.

All of these may be isolated as the hydrochlorides.

Our amination procedure is of especial advantage when Y in Formulas 1 and 2 includes either three or four carbon atoms in a chain connecting the iodine atom and the X-joined carbon atom; for its is particularly with those that ordinarily the tendency to form ring compounds exists most strongly, but which tendency in our procedure is not sufficiently great to prevent the obtaining of large yields of our desired amines.

We claim as our invention:

1. The process-step in producing a carbon-halogenated amine of the general formula:

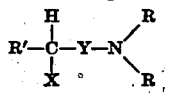

in which R and R' each represents a member of the class consisting of hydrogen atoms and alkyl groups, Y represents an acyclic divalent saturated lower-hydrocarbon radical and X represents a middle halogen, which consists in selectively aminating the carbon atom holding the iodine atom in a compound having the formula:

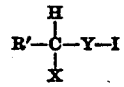

in which R, R', X, and Y have the same significance as above, by reacting that compound with a reagent of the class consisting of ammonia and primary and secondary lower-alkyl amines.

2. The process-step as set forth in claim 1, in which R' is an alkyl group.

3. The process-step as set forth in claim 1, in which Y in the initial compound contains at least two carbon atoms in a straight chain between the iodine atom and the carbon atom to which X is attached.

4. The process-step as set forth in claim 1, in which Y in the initial compound includes at least three carbon atoms and not over four carbon atoms in a chain connecting the iodine atom and the X-joined carbon atom.

5. The process-step in producing 4-chloroamyldiethylamine, which consists in selectively aminating with diethylamine the carbon atom holding the iodine atom in 1-iodo-4-chloropentane by reacting that compound with diethyl amine.

6. The process-step in producing 3-chloroamyldiethylamine, which consists in selectively aminating with diethylamine the carbon atom holding the iodine atom in 1-iodo-4-chloropentane by reacting that compound with diethyl amine.

7. The process-step in producing 3-chlorobutyldiethylamine, which consists in selectively aminating with diethylamine the carbon atom holding the iodine atom in 1-iodo-3-chlorobutane by reacting that compound with diethyl amine.

8. The process of producing a carbon-halogenated amine of the general formula:

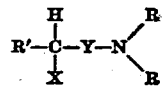

in which R and R' each represents a member of the class consisting of hydrogen atoms and alkyl groups, Y represents an acyclic divalent saturated lower-hydrocarbon radical, and X represents a middle halogen, which consists in selectively aminating the carbon atom holding the iodine atom in a compound having the formula:

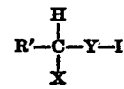

in which R, R', X, and Y have the same significance as above, by reacting that compound with a reagent of the class consisting of ammonia and primary and secondary lower-alkyl amines, to produce the hydroiodide of the desired amine, and then treating that hydroiodide with a sufficiently strong base to convert it into the desired amine.

9. The process as set forth in claim 8, in which R' is an alkyl group.

10. The process as set forth in claim 8, in which Y in the initial compound contains at least two carbon atoms in a straight chain between the iodine atom and the carbon atom to which X is attached.

11. The process as set forth in claim 8, in which Y in the initial compound includes at least three carbon atoms and not over four carbon atoms in a chain connecting the iodine atom and the X-joined carbon atom.

12. The process of producing 4-chloroamyldiethylamine, which consists in selectively aminating with diethylamine the carbon atom holding the iodine atom in 1-iodo-4-chloropentane by reacting that compound with diethylamine, to produce the hydroiodide of the desired 4-chloroamyldiethylamine, and then treating that hydroiodide with a sufficiently strong base to convert it into the desired 4-chloroamyldiethylamine.

13. The process of producing 3-chloroamyldiethylamine, which consists in selectively aminating with diethylamine the carbon atom holding the iodine atom in 1-iodo-3-chloropentane by reacting that compound with diethylamine, to produce the hydroiodide of the desired 3-chloroamyldiethylamine, and then treating that hydroiodide with a sufficiently strong base to convert it into the desired 3-chloroamyldiethylamine.

14. The process of producing 3-chlorobutyldiethylamine, which consists in selectively aminating with diethylamine the carbon atom holding the iodine atom in 1-iodo-3-chlorobutane by reacting that compound with diethylamine, to produce the hydroiodide of the desired 3-chlorobutyldiethylamine, and then treating the hydroiodide with a sufficiently strong base to convert it into the desired 3-chlorobutyldiethylamine.

HENRY B. HASS.
HAL C. HUFFMAN.

CERTIFICATE OF CORRECTION.

Patent No. 2,297,147. September 29, 1942.

HENRY B. HASS, ET AL.

It is hereby certified that error appears in the printed specification of the above numbered patent requiring correction as follows: Page 2, second column, line 36-37, claim 6, for "1-iodo-4-chloropentane" read --1-iodo-3-chloropentane--; and that the said Letters Patent should be read with this correction therein that the same may conform to the record of the case in the Patent Office.

Signed and sealed this 24th day of November, A. D. 1942.

(Seal)

Henry Van Arsdale,
Acting Commissioner of Patents.